United States Patent
Borisova et al.

(10) Patent No.: US 10,868,872 B2
(45) Date of Patent: Dec. 15, 2020

(54) METHOD AND SYSTEM FOR DETERMINING A SOURCE LINK TO A SOURCE OBJECT

(71) Applicant: YANDEX EUROPE AG, Lucerne (CH)

(72) Inventors: Tatiana Sergeevna Borisova, Moscow (RU); Dmitrii Sergeevich Zhivotvorev, Voronezh (RU)

(73) Assignee: YANDEX EUROPE AG, Lucerne (CH)

( * ) Notice: Subject to any disclaimer, the term of this patent is extended or adjusted under 35 U.S.C. 154(b) by 428 days.

(21) Appl. No.: 15/460,667

(22) Filed: Mar. 16, 2017

(65) Prior Publication Data

US 2017/0295244 A1 Oct. 12, 2017

(30) Foreign Application Priority Data

Apr. 7, 2016 (RU) .............................. 2016113265

(51) Int. Cl.
*H04L 29/08* (2006.01)
*G06N 20/00* (2019.01)
*G06F 16/951* (2019.01)

(52) U.S. Cl.
CPC .......... *H04L 67/146* (2013.01); *G06F 16/951* (2019.01); *G06N 20/00* (2019.01);
(Continued)

(58) Field of Classification Search
CPC ....... H04L 67/146; H04L 67/10; H04L 67/02; G06F 16/951; G06F 16/7844; G06F 16/94; G06N 20/00; Y02D 10/45; Y02D 10/00
See application file for complete search history.

(56) References Cited

U.S. PATENT DOCUMENTS

| | | | | |
|---|---|---|---|---|
| 7,158,971 B1 * | 1/2007 | Bascom | ............... | G06F 17/2247 |
| 7,568,148 B1 * | 7/2009 | Bharat | ................ | G06F 17/2247 |
| | | | | 715/200 |

(Continued)

FOREIGN PATENT DOCUMENTS

WO 2015/127979 A1 9/2015

OTHER PUBLICATIONS

Vraga et al., Who Taught Me That? Repurposed News, Blog Structure, and Source Identification, Journal of Communication ISSN 0021-9916, Journal of Communication 61 (2011) 795-815, 2011 International Communication Association.

*Primary Examiner* — Javier O Guzman
(74) *Attorney, Agent, or Firm* — BCF LLP

(57) ABSTRACT

There is disclosed a method of determining a source link, the source link being associated with a source object, the method executable on a server, the method comprising: acquiring a plurality of published objects; creating a plurality of theme clusters by clustering the plurality of published objects by its respective theme; extracting from each published object contained in a respective theme cluster, at least one potential source link; generating, at least one link-cluster pair, where, for each link-cluster pair, a set of features representative of a property of the link-cluster pair is generated; based on the set of features associated with each link-cluster pair, determining the source link associated with the source object for the given theme cluster; and associating the source link with each of the plurality of published objects clustered in the associated theme cluster.

18 Claims, 5 Drawing Sheets

(52) U.S. Cl.
CPC .............. *H04L 67/10* (2013.01); *H04L 67/02* (2013.01); *Y02D 10/00* (2018.01)

(56) References Cited

U.S. PATENT DOCUMENTS

| | | | |
|---|---|---|---|
| 7,577,655 B2 | 8/2009 | Curtiss et al. | |
| 8,396,876 B2 | 3/2013 | Kennedy et al. | |
| 8,442,923 B2 | 5/2013 | Gross | |
| 8,577,866 B1* | 11/2013 | Osinga | G06F 16/353 |
| | | | 707/710 |
| 8,707,459 B2 | 4/2014 | Brock et al. | |
| 8,996,529 B2* | 3/2015 | Gross | H04L 67/10 |
| | | | 707/739 |
| 9,235,625 B2 | 1/2016 | Lewis et al. | |
| 9,244,897 B1* | 1/2016 | Sebastian | H04L 9/3213 |
| 9,740,731 B2* | 8/2017 | Gross | G06Q 30/00 |
| 10,346,462 B2* | 7/2019 | Rodriguez | G06F 16/58 |
| 2002/0099723 A1* | 7/2002 | Garcia-Chiesa | G06F 16/951 |
| 2003/0103310 A1* | 6/2003 | Shirriff | G06F 11/2294 |
| | | | 361/119 |
| 2004/0255237 A1* | 12/2004 | Tong | G06F 16/951 |
| | | | 715/232 |
| 2006/0287980 A1* | 12/2006 | Liu | G06F 16/951 |
| 2007/0027864 A1* | 2/2007 | Collins | G06Q 30/0211 |
| 2007/0294252 A1* | 12/2007 | Fetterly | G06F 16/951 |
| 2008/0059486 A1* | 3/2008 | Pappas | G06F 16/951 |
| 2009/0048927 A1* | 2/2009 | Gross | G06Q 30/00 |
| | | | 705/14.42 |
| 2014/0280150 A1* | 9/2014 | Hernandez | G06F 16/285 |
| | | | 707/737 |

* cited by examiner

METHOD AND SYSTEM FOR DETERMINING A SOURCE LINK TO A SOURCE OBJECT

CROSS-REFERENCE

The present application claims priority to Russian Patent Application No. 2016113265, filed Apr. 7, 2016, entitled "METHOD AND SYSTEM FOR DETERMINING A SOURCE LINK TO A SOURCE OBJECT", the entirety of which is incorporated herein by reference.

FIELD

The present technology teaches a method for determining a source link.

BACKGROUND

A typical news aggregator system is configured to crawl the web to gather and present a wide array of published objects by theme.

With the growth of accessibility to the internet, there has been a constant rise of the number of objects published on the internet. In internet media, when an object is published by a party, it is common to see the theme/topic of the object, to be republished by third parties recurrently. In some situations, after a series of republishing the object, the content of the object may be changed so that the original content of the initial object may be distorted.

That being said, the news aggregator system may expose users to different published objects relating to the same theme, but all having some differences with regards to its contents.

Thus, the inaccurate display of subsequently published objects, such as the published objects that are not fully consistent with the original object from which it derives, can increase the repeated searches of the user, consequently resulting in increased consumption of energy and increased consumption of bandwidth.

U.S. Pat. No. 8,707,459 provides a method of making a determination of originality of content. At least one originality factor related to the content is analyzed, wherein the originality factor is independent of a time when the content is detected. Based on the analysis of the at least one originality factor, automatically the determination is automatically made. The determination is outputted.

U.S. Pat. No. 8,577,866 discloses methods, systems, and apparatus, including computer program products for identifying original content. In one aspect a method is described that includes deriving a plurality of content pieces from a collection of documents, each content piece occurring in one or more documents in the collection of documents. Each document in the collection of documents is associated with a time and an author. A first document in the collection of documents is identified, the identified first document being the earliest document containing an occurrence of a first piece of content. A first author associated with the first document is ranked based on a number of documents that contain at least one occurrence of the content piece and that are associated with an author other than the first author.

U.S. Pat. No. 8,396,876 relates to identifying authoritative sources of multimedia content useable in rank ordering class-dependent search-query results of multimedia content. In one embodiment, a citation model is employed for measuring or otherwise determining a strength of an authority to a content source. In one embodiment, a directed graph is constructed over a network of sources based on a propensity of one source to "cite" content provided by another source. In one embodiment, a random walk may be conducted across the network of sources to arrive at authority scores for each source in the network. In another embodiment, a machine-learning algorithm may be used to arrive at authority scores. The authority scores may then be applied for ranking, for example, search-query results, and/or retrieval purposes.

U.S. Pat. No. 8,996,529 relates to a networked computer system that identifies, optimizes and recommends content sources for users. The content sources can be used for providing news feeds, search results, etc. based on taking into net useful content contributed by such sources over other sources.

SUMMARY

It is an object of the present technology to ameliorate at least some of the inconveniences present in the prior art.

The present disclosure is based upon developers' appreciation that the unavailability of a source link associated to the source object can cause viewer dissatisfaction when wanting to locate the original object as published when exposed to a plurality of published objects sharing the same theme but differing on some aspects.

In accordance with one broad aspect of the present technology, there is provided a method of determining a source link, the source link being a network address associated with a source object having an original theme from which the theme of a plurality of subsequently published objects are derived, the method executable on a server, the server being coupled to a network, the method comprising: acquiring by the server, the plurality of published objects, each of the plurality of the published objects being accessible via the network at a respective network address; analyzing a respective theme of each of the plurality of the published object to create a plurality of theme clusters; extracting from each published object contained in a respective theme cluster, at least one potential source link, the at least one potential source link being a potential network address of the source object; generating, based on the at least one extracted potential source link and the theme cluster associated with the at least one extracted potential source link, at least one link-cluster pair, generating, for each link-cluster pair, a set of features representative of a property of the link-cluster pair; based on the set of features associated with each link-cluster pair, determining the source link associated with the source object for the given theme cluster, the source link being one of the at least one extracted potential source link; and associating the source link with each of the plurality of published objects clustered in the associated theme cluster.

In some implementations of the method, the method further comprises, responsive to a request for access by an electronic device, via the network, to a given published object from the plurality of published objects, retrieving the given published object and concurrently transmitting an indication of the source link.

In another implementation of the method, the plurality of published objects is acquired from a crawler database.

In another implementation of the method, analyzing the respective theme comprises analyzing a respective content of the plurality of published objects, the content including at least one of (i) a title and (ii) a body of text.

In another implementation of the method, the at least one potential source link of a given published object comprises of at least one outgoing link contained in the given published object.

In another implementation of the method, the source object is included in the plurality of published objects in the given theme cluster.

In another implementation of the method, the source object is not included in the plurality of published objects in the given theme cluster.

In another implementation of the method, prior to extracting the at least one potential source link from a given published object, determining a number of incoming links for the given published object, the number of incoming links representing a number of outgoing links within the published objects of the given theme cluster directed at the given published object.

In another implementation of the method, extracting the at least one potential source link is executed for published objects having a pre-determined number of incoming links.

In another implementation of the method, the set of features comprises of at least one of: a difference-in-time feature, the difference-in-time feature being associated with a difference in the time of publication of the given published object containing the extracted potential source link and a median publication time for the other published objects contained within the same theme cluster; a source reputation feature of a publication source associated with the published object containing the extracted potential source link; a destination reputation feature of the source associated with the destination of the extracted potential source link; an aggregated reputation feature of publication sources, within the theme cluster, which share the extracted potential source link; a normalized feature representing the number of published objects sharing the extracted potential source link normalized by the number of published objects contained in the theme cluster; a difference feature representing the presence of other extracted potential source links within the theme cluster; a presence feature representing the presence of a publication source identifier associated with the extracted potential source link in the content of the published objects contained within the theme cluster; a content feature representing the presence of one or more publication source identifiers within the content of the published object associated with the link-cluster pair; and a reference feature representing the presence of the publication source identifier associated with the extracted potential source link within the respective content of the of published objects contained within the theme cluster.

In another implementation of the method, the reputation of the publication source associated with the published object containing the potential source link and the reputation of the publication source associated with the potential source link is a pre-determined parameter.

In another implementation of the method, determining the source link is executed using a machine learning algorithm.

In another implementation of the method, the machine learning algorithm is configured to receive the set of features as an input feature.

In another implementation of the method, the method further comprises training the machine learning algorithm.

In another implementation of the method, determining the source link is executed without accessing the source object.

In accordance with another broad aspect, there is provided a server configured to determine a source link, the source link being a network address associated with a source object having an original theme from which the theme of a plurality of subsequently published objects are derived, the server being coupled to a network, the server comprising: at least one computer processor configured to: acquire by the server, the plurality of published objects, each of the plurality of the published objects being accessible via the network at a respective network address; analyze a respective theme of each of the plurality of the published object to create a plurality of theme clusters; extract from each published object contained in a respective theme cluster, at least one potential source link, the at least one potential source link being a potential network address of the source object; generate, based on the at least one extracted potential source link and the theme cluster associated with the at least one extracted potential source link, at least one link-cluster pair, generate, for each link-cluster pair, a set of features representative of a property of the link-cluster pair; based on the set of features associated with each link-cluster pair, determine the source link associated with the source object for the given theme cluster, the source link being one of the at least one extracted potential source link; and associate the source link with each of the plurality of published objects clustered in the associated theme cluster.

In another implementation of the server, the processor is further configured to, responsive to a request for access by an electronic device, via the network, to a given published object from the plurality of published objects, retrieve the given published object and concurrently transmit an indication of the source link.

In another implementation of the server, the plurality of published objects is acquired from a crawler database.

In another implementation of the server, the analysis of the respective theme comprises analyzing a respective content of the plurality of published objects, the content including at least one of (i) a title and (ii) a body of text.

In another implementation of the server, the at least one potential source link of a given published object comprises of at least one outgoing link contained in the given published object.

In another implementation of the server, the source object is included in the plurality of published objects in the given theme cluster.

In another implementation of the server, the source object is not included in the plurality of published objects in the given theme cluster.

In another implementation of the server, prior to extracting the at least one potential source link from a given published object, determine a number of incoming links for the given published object, the number of incoming links representing a number of outgoing links within the published objects of the given theme cluster directed at the given published object.

In another implementation of the server, extracting the at least one potential source link is executed for published objects having a pre-determined number of incoming links.

In another implementation of the server, the set of features comprises of at least one of: a difference-in-time feature, the difference-in-time feature being associated with a difference in the time of publication of the given published object containing the extracted potential source link and a median publication time for the other published objects contained within the same theme cluster; a source reputation feature of a publication source associated with the published object containing the extracted potential source link; a destination reputation feature of the source associated with the destination of the extracted potential source link; an aggregated reputation feature of publication sources, within the theme cluster, which share the extracted potential source link; a normalized feature representing the number of published objects sharing the extracted potential source link normalized by the number of published objects contained in the theme cluster; a difference feature representing the presence of other extracted potential source links within the theme cluster; a presence feature representing the presence of a publication source identifier associated with the extracted potential source link in the content of the published objects contained within the theme cluster; a content feature representing the presence of one or more publication source identifiers within the content of the published object associated with the link-cluster pair; and a reference feature representing the presence of the publication source identifier associated with the extracted potential source link within the respective content of the of published objects contained within the theme cluster.

In another implementation of the server, the reputation of the publication source associated with the published object containing the potential source link and the reputation of the publication source associated with the potential source link is a pre-determined parameter.

In another implementation of the server, determining the source link is executed using a machine learning algorithm.

In another implementation of the server, the machine learning algorithm is configured to receive the set of features as an input feature.

In another implementation of the server, the processor is further configured to train the machine learning algorithm.

In another implementation of the server, determining the source link is executed without accessing the source object.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
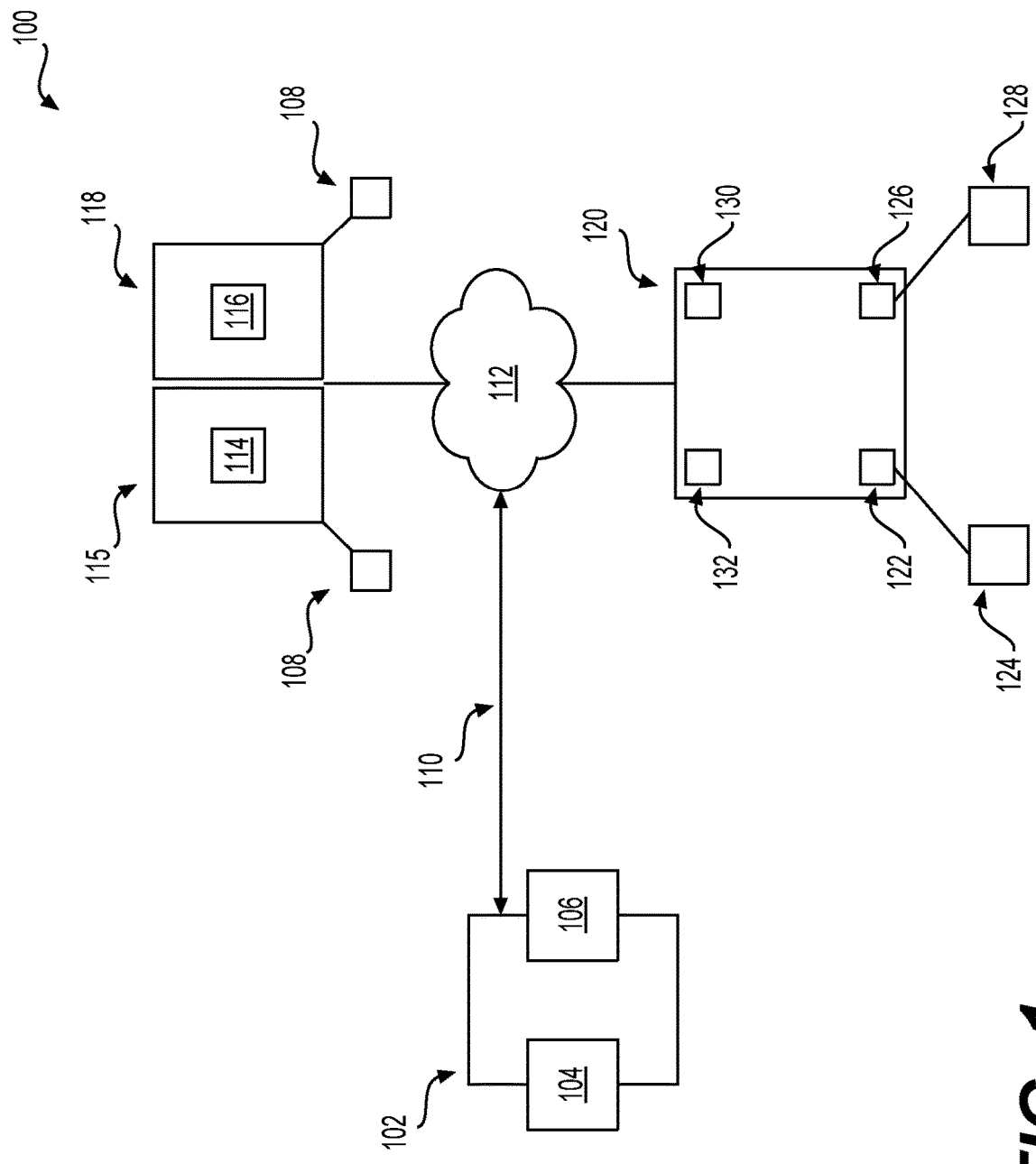
FIG. 1 is a schematic illustration of a system in accordance with non-limiting embodiments of the present technology for determining a source link.

[1]. Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises hardware and/or software and/or firmware (or a combination thereof), as is known in the art to execute a browser application 104 and/or a mobile application 106. In some embodiments, each of the browser application 104 and the mobile application 106 is configured to request an object (described below), from a news aggregator service provided by a server 120, as it will be explained in more detail below.

How the browser application 104 is implemented is not particularly limited. One example of the browser application 104 may be embodied as a Yandex.Browser™. How the browser application 104 is implemented is generally known in the art and as such, will not be described here at much length.

Generally speaking the mobile application 106 is a computer program designed to run on the electronic device 102, and suffice it to say for now that the mobile application 106 may or may not have been previously downloaded and/or installed on the electronic device 102. In some non-limiting embodiments, the mobile application 106 is a proprietary mobile application provided by a provider associated with the server 120.

The electronic device 102 is coupled to a communication network 112 via a communication link 110. In some non-limiting embodiments of the present technology, the communication network 112 can be implemented as the Internet. In other embodiments of the present technology, the communication network 112 can be implemented differently, such as any wide-area communication network, local-area communications network, a private communications network and the like.

How the communication link 110 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link 110 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 110 and the communication network 112 are provided for illustration purposes only. As such, those skilled in the art will easily appreciate other specific implementational details for the electronic device 102, the communication link 110, and the communication network 112. As such, by no means, examples provided herein above are meant to limit the scope of the present technology.

The system 100 further includes a first object hosting server 115 and a second object hosting server 118 coupled to the communication network 112. Each of the first object hosting server 115 and the second object hosting server 118 can be implemented as a conventional computer server. In an example of an embodiment of the present technology, each of the first object hosting server 115 and the second object hosting server 118 can be implemented as a Dell™ PowerEdge™ Server running the Microsoft™ Windows Server™ operating system. Needless to say, each of the first object hosting server 115 and the second object hosting server 118 can be implemented in any other suitable hardware and/or software and/or firmware or a combination thereof. In the depicted non-limiting embodiment of the present technology, each of the first object hosting server 115 and the second object hosting server 118 is a single server. In alternative non-limiting embodiments of the present technology, the functionality of the first object hosting server 115 and/or the second object hosting server 118 may be distributed and may be implemented via multiple servers.

In some embodiments of the present technology, and generally speaking, each of the first object hosting server 115 and the second object hosting server 118 functions to serve as a repository for one or more published objects (such as a first published object 114 and a second published object 116, respectively) and is under control and/or management of an object hosting provider (not depicted), such as, for example, and operator of Jiji Press™ (news agency), BuzzFeed™ (entertainment news agency), WordPress™ (blogging platform), and the like.

In some embodiments of the present technology, the first object hosting server 115 hosts the first published object 114, and the second object hosting server 118 hosts the second published object 116. Each of the first published object 114 and the second published object 116 is representative of a web resource accessible (by either some or all of: the electronic device 102, the server 120) through the communication network 112.

In the context of the present specification, the term "object" refers to any webpage, which is presentable visually by the electronic device 102, associated with a particular web resource address (such as an Uniform Resource Locator (URL)). Thus the object can include written text as well as images, graphics, animation, video, and the like. It is contemplated that a content of the object can contain a text portion, such as the title, the body, a comment section (if any), and the like. Each of the first published object 114 and the second published object 116 is accessible by the electronic device 102 via the communication network 112, for example by means of the user typing in the URL in the browser application 104 or executing a web search using a search application (not depicted) on the electronic device 102.

As described previously, each of the first object hosting server 115 and the second object hosting server 118 is under control and/or management of the object hosting provider (not depicted). For example, if the object hosting provider is an online news agency, such as VICE News™, the first published object 114 may be a news article. On the other hand, if the object hosting provider of the second object hosting server 118 which hosts the second published object 116 is a blogging service, such as Blogger™, the second published object 116 may be a blog post. Again, it should be understood that the examples provided above are merely for illustrative purposes, and are not intended to be limitative.

In some embodiments of the present technology, the first published object 114 and the second published object 116 share a same theme. In the present specification, the term "theme" refers to a story, a topic, a subject, associated with the content of the published object. In some embodiments of the present technology, the second published object 116 is a "re-post", a follow-up publication, and the like, of the first published object 114. For example, the first published object 114 may be an original article, and the second published object 116 may be associated with, and/or derived from, the first published object 114. Within this particular example, the first published object 114 is referred to as a "source object", and the second published object 116 is referred to as a "subsequently published object".

In some embodiments, each of the first object hosting server 115 and the second object hosting server 118 comprises one or more object databases 108 which functions to store the first published object 114 and the second published object 116 which may be delivered and displayed on the electronic device 102. Generally speaking, each published object hosted (e.g. the first published object 114 and the second published object 116) by each of the first object hosting server 115 and the second object hosting server 118 has a server-assigned filename that uniquely identifies the published object (e.g. the first published object 114 and the second published object 116) in the object database 108. Each object database 108 includes, for each published object (e.g. the first published object 114 and the second published object 116), indexing data by which each published object (e.g. the first published object 114 and the second published object 116) can be identified and selectively retrieved from the object database 108.

Although the object database 108 is depicted as separate from each of the first object hosting server 115 and the second object hosting server 118 to which it is dedicated via a dedicated link (not numbered), the object database 108 can be implemented as being part of each of the first object hosting server 115 and the second object hosting server 118.

Generally speaking, as the object hosting provider (not depicted) uploads (or posts) new object on the web, a new published object (such as one similar to the first published object 114 and/or the second published object 116) having a unique URL is generated, and the URL is stored in the object database 108. For example, if an article is published online by the Montreal-based news agency, LaPresse™, a published object having a unique link (such as the URL) will be stored in the object database 108.

In some non-limiting embodiments of the present technology, the first published object 114 and the second published object 116 may contain one or more outgoing link (described below). The manner in which the outgoing link is contained within the published object is not limited, and may appear in the content of the published object, such as title section of the published object, the body of the published object, the comment section, and the like. It is also contemplated that the outgoing link may be comprised within the metadata of the published object. It is also contemplated that the outgoing link may be a URL that is directed to the source object or to the subsequently published object. It is contemplated that the source object can be an already published news article, a blog post, an ad, a post in a social media platform (such as, but not limited to, Twitter™, Facebook™, and the like), just to name a few.

Also coupled to the communication network 112 is a server 120. Suffice it to say that the server 120 can (but doesn't have to) be implemented in a similar manner to the first object hosting server 115 and/or the second object hosting server 118. In the depicted non-limiting embodiments of the present technology, the server 120 is a single server. In alternative non-limiting embodiments of the present technology, the functionality of the server 120 may be distributed and may be implemented via multiple servers.

The implementation of the server 120 is well known. However, briefly speaking, the server 120 comprises a communication interface (not depicted) structured and configured to communicate with various entities (such as the electronic device 102) via the communication network 112. The server 120 further comprises at least one computer processor (not depicted) operationally connected with the communication interface and structured and configured to execute various processes to be described herein.

In some embodiments of the present technology, the server 120 is under control and/or management of a provider of news aggregator services (not depicted), such as, for example, an operator of Yandex News™, Google News™, just to name a few. As such, the server 120 hosts a main news aggregator page (not depicted) accessible by the electronic device 102 by means of typing in/copying/clicking an URL using the browser application 104 or launching the mobile application 106. The server 120 is further configured to execute one or more requests responsive to the mobile application 106 and/or the browser application 104, such as rendering a requested object associated with the news aggregator service. Just as an example, the request from the mobile application 106 and/or the browser application 104 may be a clicking from the user on a link associated with the published object (such as the first published object 114, and/or the second published object 116), the link associated with the published object being displayed on the main news aggregator page.

As such, the server 120 is also configured to execute a crawling function to gather the published objects (such as the first published object 114 and the second published object 116) from the first object hosting server 115 and/or second object hosting server 118 (and other hosting servers potentially present within the system 100), and, to that end, comprises a crawler application 122. Although the crawler application 122 is depicted as being comprised within the server 120, in alternative embodiments, the functionality of the crawler application 122 may be distributed and may be implemented via multiple servers.

Generally speaking, the crawler application 122 is configured to periodically access the first object hosting server 115 and the second object hosting server 118, and other hosting servers potentially present within the system 100, to identify and retrieve the objects hosted by the first object hosting server 115 and the second object hosting server 118 (such as the first published object 114 and the second published object 116).

The crawler application 122 is connected via a dedicated link (not numbered) to a crawler database 124. As will be discussed in more detail below, an indication of the crawled objects are indexed and stored in the crawler database 124. Generally speaking, the crawler database 124 also contains a record for each crawled object such as the date of the last access or crawling, which may be used by the crawler application 122 to keep the crawler database 124 up-to-date, which can optimize the crawling process. Although depicted as separate from the server 120 to which it is coupled to via a dedicated link (not numbered), the crawler database 124 can be implemented as part of the server 120.

The server 120 also comprises a clustering module 126 for clustering the crawled objects by themes. Generally speaking, the term "clustering" refers to the classification of the crawled objects into different groups (e.g., clusters) so the crawled objects in each cluster share some common theme. Although the clustering module 126 is depicted as being part of the server 120, in alternative embodiments, the functionality of the clustering module 126 may be distributed and may be implemented via multiple servers. Suffice it to say for now that the clustering module 126 is configured to access the crawled objects and cluster the crawled objects from the crawler database 124 into groups having the same theme based on its respective content (ex. body of text and/or title). The manner in which the clustering is done is not limited, and may be done using the bag-of-words model, the latent dirichlet allocation model, just to name a few.

As will be discussed in more detail below, the clustered objects are indexed and stored in a cluster database 128. Although depicted as separate of the server 120 to which it is coupled to via a dedicated link (not numbered), the cluster database 128 can be implemented a part of the server 120.

The server 120 further comprises a link extractor module 130. Although the link extractor module 130 is depicted as being part of the server 120, the link extractor module 130 may be implemented as a separate entity from the server 120. As will be discussed in more detail below, the link extractor module 130 is configured to extract the one or more outgoing links contained within each clustered objects contained in the cluster database 128.

The server 120 is also configured to execute a source link prediction algorithm 132. As will discussed further in detail below, the source link prediction algorithm 132 is configured to analyze the one or more extracted outgoing links of the clustered objects contained in the cluster database 128. In the context of the present specification, the terms "source link" refers to the web resource address (e.g. URL) directed to the source object. Although the source link prediction algorithm 132 is depicted as being part of the server 120, the functionality of the source link prediction algorithm 132 may be implemented may be distributed and may be implemented via multiple servers.

Figure 2:
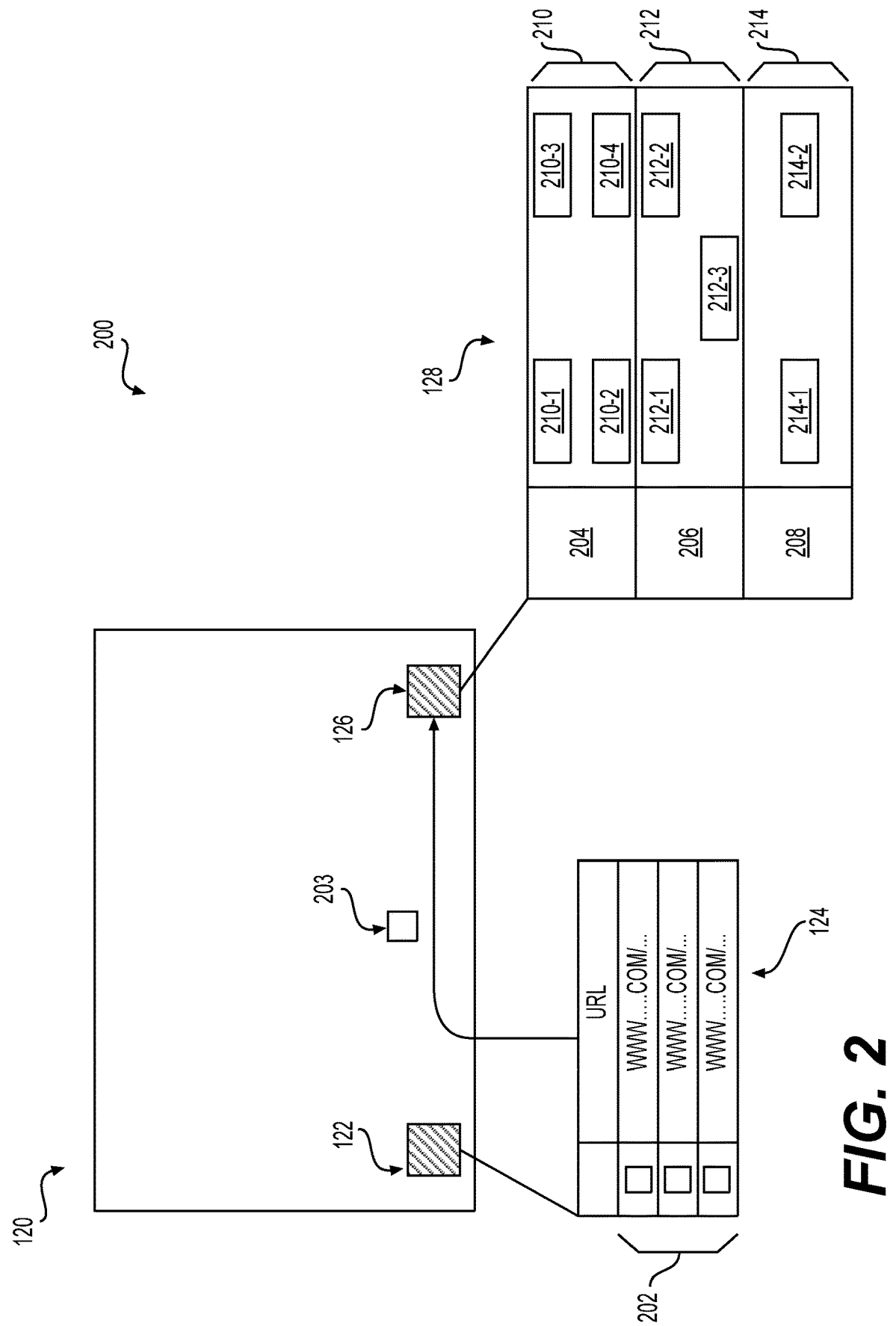
FIG. 2 is a block diagram illustrating an architecture of the server of the system of FIG. 1, illustrating an example of a theme clustering process.

FIG. 2 is a schematic diagram depicting an architecture 200 of the server 120 illustrating an example of a theme clustering process, the architecture 200 including the server 120 containing the crawler application 122 and the clustering module 126, according to some implementations.

As discussed briefly previously, the crawler application 122 is configured to periodically access the first object hosting server 115 and the second object hosting server 118 (as well as other object hosting servers potentially present within the system 100) to identify and retrieve the published objects hosted therein (such as the first published object 114 and the second published object 116). The crawler application 122 is then configured to create an index for a set of crawled objects 202 in the crawler database 124. For example, it is contemplated that the crawler database 124 contains an indication for each of the crawled objects 202, such as its respective URL. Although in the depicted illustration the set of crawled objects 202 contains three crawled objects, it is merely an example, and is not intended to be limitative.

In some embodiments, the crawler database 124 and/or the crawler application 122, transmits a data packet 203 to the clustering module 126. The data packet 203 comprises an indication of the crawled objects 202 (e.g. the URLs) to be clustered by the clustering module 126.

Upon receiving the data packet 203, the clustering module 126 clusters the set of crawled objects 202 by theme. As stated previously, the manner in which the clustering is done is not limited, and may be done by analyzing the contents (such as the title, the body, the comment section, the metadata or a combination thereof) of the crawled objects 202 using any known clustering method.

Each clustered object is then indexed and stored within the cluster database 128. For example, the cluster database 128 comprises a first theme cluster 204, a second theme cluster 206 and a third theme cluster 208. The three theme clusters (i.e. the first theme cluster 204, the second theme cluster 206 and the third theme cluster 208) each relates to a different theme from one another.

As seen in FIG. 2, the first theme cluster 204 comprises of a set of clustered objects 210 containing four clustered objects (individually, 210-1, 210-2, 210-3, and 210-4), the second theme cluster 206 comprises a set of clustered object 212 containing three clustered objects (individually, 212-1, 212-2, and 212-3), and the third theme cluster 208 comprises a set of clustered objects 214 containing two clustered objects (individually, 214-1 and 214-2). It should be expressly understood that the number of theme clusters and the number of clustered objects contained therein are provided as examples only and are not limitative.

Figure 3:
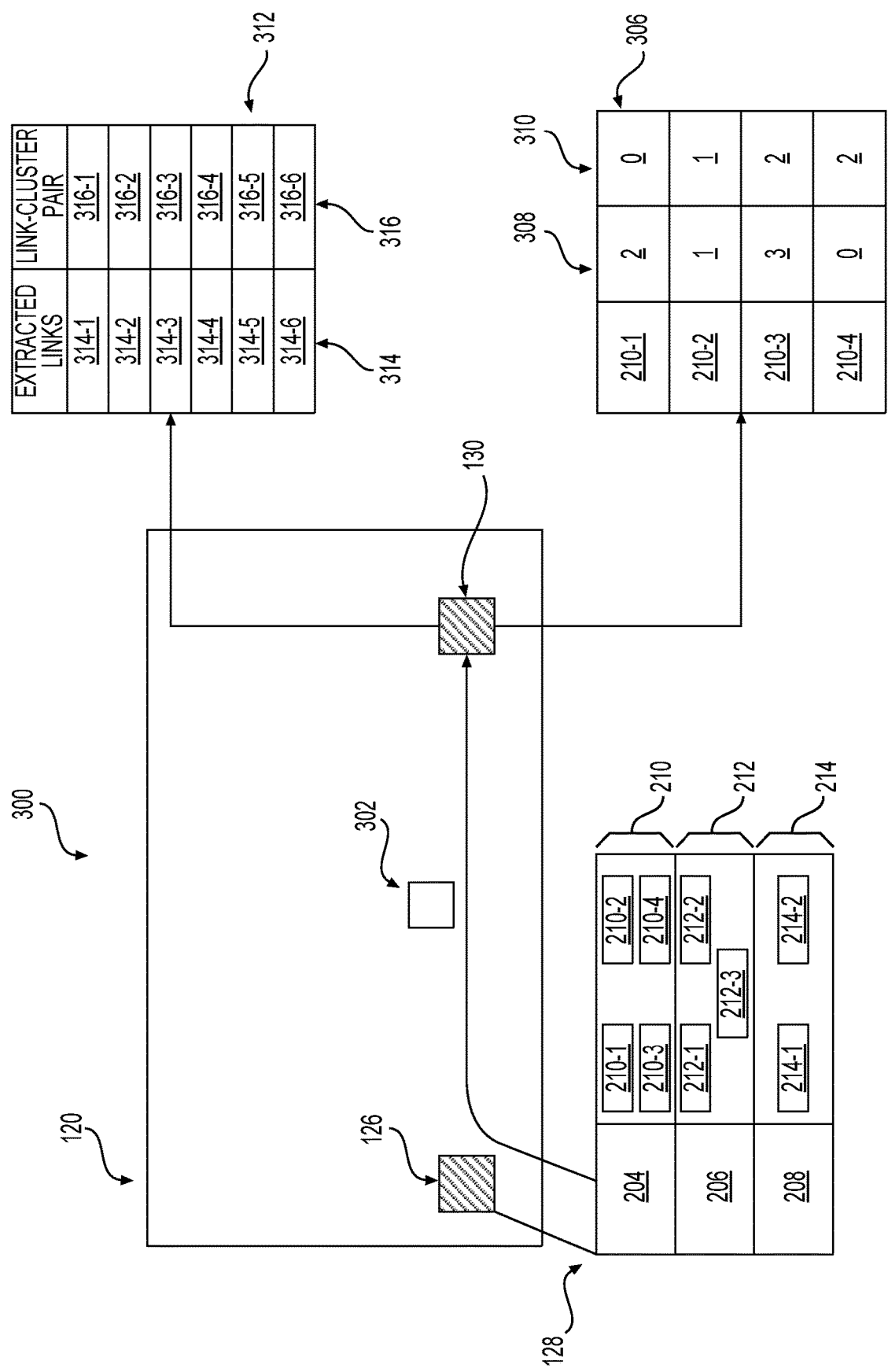
FIG. 3 is a block diagram illustrating an architecture of the server of the system of FIG. 1, illustrating an example of a link extraction process.

FIG. 3 is a schematic diagram demonstrating an architecture 300 of the server 120 illustrating an example of a link extraction process, the architecture 300 including the server 120 comprising the clustering module 126 and the link extractor module 130 according to some implementations of the present technology.

As stated previously, the set of crawled objects 202 is clustered into theme clusters (such as the first theme cluster 204, the second theme cluster 206, and the third theme cluster 208). Following the clustering, the cluster database 128 and/or the clustering module 126 transmits a data packet 302 to the link extractor module 130. The data packet 302 comprises an indication of the clustered objects (such as the URL) contained within a particular theme cluster. For example, the data packet 302 may comprise an indication of the set of clustered objects 210 contained within the first theme cluster 204.

Upon receiving the data packet 302, the link extractor module 130 analyzes the set of clustered objects 210 to identify the outgoing links contained within each of the clustered object 210-1, 210-2, 210-3, and 210-4. The manner in which the link extractor module 130 identifies the outgoing links is not limited, and may for example, be done by analyzing the content, analyzing the metadata, and/or by using a link-extractor software, such as the IWebTool™'s Link Extractor, and the like. In some embodiments, during the crawling process, the crawler application 122 is configured to identify the outgoing links contained within each of the published objects of the set of crawled objects 202, as such, an indication of the identified outgoing links may be contained within the data packet 302. In some embodiments of the present technology, the link extractor module 130 may organize a link count database 306 which identifies the number of outgoing links 308 and incoming links 310 for each clustered object contained within the data packet 302.

In the context of the present specification, the terms "outgoing link" refer to the one or more links contained within the given clustered object. It is contemplated that the link can be contained within the content of the given clustered object, such as the title and/or the body and/or the comment, and/or the metadata of the given clustered object. As such, the link contained within the clustered object 210-1 which is directed to another published object (such as the clustered object 210-2, or a non-clustered/un-crawled but published object) is referred to as an "outgoing link".

In the context of the present specification, the term "incoming link" refers to the one or more outgoing links contained within the set of clustered objects 210 pointing a given clustered object contained within the set of clustered objects 210. For example, if within the clustered object 210-2 there is an outgoing link directed at the clustered object 210-1, the link will be considered as an "incoming link" with respected to the clustered object 210-1.

As illustrated in FIG. 3, the link extractor module 130 identifies, for each of the clustered objects 210-1, 210-2, 210-3, and 210-4 the number of outgoing links 308 contained therein. Continuing with the example of the data packet 302 comprising the set of clustered objects 210 contained within the first theme cluster 204, the link extractor module 130 may have identified that for the clustered object 210-1, there are 2 outgoing links; for the clustered object 210-2, there is 1 outgoing link; for the clustered object 210-3, there are 3 outgoing link; and for the clustered object 210-4, there are no outgoing links. In total, there are 6 outgoing links contained within the set of clustered objects 210.

Upon identifying the outgoing links 308 contained within the set of clustered objects 210, the link extractor module 130 further identifies whether each outgoing link 308 is directed at one of the clustered objects of the set of clustered objects 210. Following the example above, the link extractor module 130 may have identified that out of the 6 outgoing links 308, 5 of them are considered incoming links to the set of clustered objects 210 organized as follow: the clustered objects 210-1 is not the destination of any of the 6 outgoing links 308; the clustered object 210-2 is the destination of one of the 6 outgoing links 308; the clustered object 210-3 is the destination of 2 of the 6 outgoing links 308; the clustered object 210-4 is the destination of 2 of the 6 outgoing links 308. In this particular example, 5 out of the 6 outgoing links 308 are "accounted" for, while remaining 1 outgoing link 308 is "unaccounted" for. That is to say, the unaccounted outgoing link 308 may be directed to a published object that has not been clustered into the first theme cluster 204, or has not been crawled by the crawler application 122.

The link extractor module 130 is further configured to extract the outgoing links 308 of each of the clustered objects of the set of clustered objects 210. In some embodiments, the link extractor module 130 is configured to extract the outgoing links 308 of each of the clustered objects of the set of clustered objects 210 having fulfilled a pre-determined criterion. In some embodiments, the pre-determined criterion is a threshold based on the number of incoming links 310 destined to the given clustered object. For example, and not as a limitation, the link extractor module 130 may be configured to extract the one or more outgoing links 308 for each clustered object of the set of clustered objects 210 having at least 1 incoming link 310. Continuing the example above, it has been determined that the clustered objects 210-1 is not the destination of any of the outgoing links 308, and the clustered objects 210-2, 210-3, and 210-4 are the destination of at least one outgoing links 308. As such, the link extractor module 130 extracts the 4 links from the clustered objects 210-2 and 210-3 (note that the clustered object 210-4 does not have any outgoing links 308). It is to be expressly understood that the threshold based on the number of incoming links is merely an example, and it is contemplated that other threshold can be used.

In some embodiments, the link extractor module 130 generates an extracted link database 312, which comprises the outgoing links 308. The set of extracted links 314 comprises the 6 extracted links from the set of clustered objects 210, namely, a first link 314-1, a second link 314-2, a third link 314-3, a fourth link 314-4, a fifth link 314-5 and a sixth link 314-6. As the set of extracted links 314 is identified, the link extractor module 130 is configured to generate, a set of link-cluster pairs 316, where for each of the extracted links 314-1 to 314-6, a link-cluster pair 316-1 to 316-6 is generated, respectively.

Within the present specification, the terms "link-cluster pair" refers to a relationship property between the given extracted link and the theme cluster containing the crawled object associated with the given extracted link.

In some embodiments, the link extractor module 130 is configured to calculate a set of features for each of the link-cluster pairs 316-1 to 316-6 contained within a data packet 318. In some embodiments, the set of features are representative of the properties of each link-cluster pair (such as the link-cluster pair 316-1 to 316-6). In some embodiments of the present technology, the set of features computed for each link-cluster pair 316-1 to 316-6 may include, but is not limited to the following:

(i) a difference-in-time feature, the difference-in-time feature being associated with a difference in the time of publication of the clustered object containing the extracted link and a median publication time for the other clustered objects contained within the same theme cluster;

(ii) a source reputation feature of a publication source associated with the clustered object containing the extracted link;

(iii) a destination reputation feature of a source associated with the destination of the extracted link;

(iv) an aggregated reputation feature of publication sources, within the theme cluster, which share the extracted link;

(v) a normalized feature representing the number of clustered objects sharing the extracted link normalized by the number of clustered objects contained in the theme cluster;

(vi) a difference feature representing the presence of other extracted links within the theme cluster;

(vii) a presence feature representing the presence of a publication source identifier associated with the extracted link in the respective content of the clustered objects contained in the theme cluster;

(viii) a content feature representing the presence of one or more publication source identifiers within the content of the clustered object associated with the link-cluster pair; and (ix) a reference feature representing the presence of the publication source identifier associated with the extracted link within the respective content of the clustered objects contained in the theme cluster.

Each of the above mentioned features will now be explained in detail.

(i) A difference-in-time feature, the difference-in-time feature being associated with a difference in the time of publication of the clustered object containing the extracted link and a median publication time for the other clustered objects contained within the same theme cluster.

Taking the link-cluster pair 316-1 as an example, the difference-in-time feature is calculated using the difference in time of publication (i.e. posting) of the clustered object containing the extracted link 314-1, and a median publication time for the remaining clustered objects containing the extracted link 314-2 to 314-6.

(ii) A source reputation feature of a publication source associated with the clustered object containing the extracted link.

Taking the link-cluster pair 316-1 as an example, the source reputation feature is calculated based on the reputation of the publication source associated with the clustered object containing the extracted link 314-1.

In the context of the present context, the term "publication source" refers to an identity of the entity having published the given clustered object. For example, if the extracted link 314-1 has been extracted from the clustered object 210-1 which is accessible via the URL www.cnn.com/story123, the publication source is CNN™. The manner of determining the publication source is not limited, and may be based, inter alia, on the host name of the URL.

In the context of the present specification, "reputation" refers to a reliability of the source. The manner in determining the reputation for the publication source is not limited, and may be determined using different methods, such as, for example, the use of the PageRank algorithm, the number of objects published by the publication source, the average number of objects published by the publication source, a score determined by the provider or the manager of the server 120, or a combination thereof, and the like.

(iii) A destination reputation feature of the publication source associated with the destination of the extracted link.

Taking the link-cluster pair 316-1 as an example, the destination reputation feature is calculated based on the reputation of the publication source associated with the destination of the extracted link 314-1.

For example, the extracted link 314-1 may be associated with a particular published object (contained or not contained within the first theme cluster 204), with the URL www.facebook.com/john.doe/post123. The link extractor module 130 is configured to identify Facebook™ as the publication source associated with the destination of the extracted link 314-1. The link extractor module 130 is further configured to calculate the reputation of FaceBook™, based on, for example, the use of the PageRank algorithm, the number of objects published by the publication source, the average number of objects published by the publication source, a score determined by the provider or the manager of the server 120, or a combination thereof, and the like.

(iv) An aggregated reputation feature of publication sources, within the theme cluster, which share the extracted link.

Taking the link-cluster pair 316-1 as an example, this aggregated reputation feature is calculated based on the aggregated reputation of publication sources within the first theme cluster 204 which contains the extracted link 314-1.

For example, if it is determined that the URL of the extracted link 314-1 is an extracted link for the clustered objects 210-1 and 210-2, the link extractor module 130 is configured to calculate the aggregated reputation feature of the publication sources associated with the clustered object 210-1 and 210-2.

(v) A normalized feature representing the number of clustered objects sharing the extracted link normalized by the number of clustered objects contained in the theme cluster.

Taking the link-cluster pair 316-1 as an example, the normalizing feature is calculated based on the number of clustered objects sharing the extracted link 314-1 within the first theme cluster 204.

For example, if it is determined that the first theme cluster 204 contains 4 clustered objects, and 2 of the clustered objects are determined to be sharing the extracted link 314-1, the link extractor module 130 is configured to calculate that 50% of the clustered objects contained in the first theme cluster 204 contains the extracted link 314-1. Based on this information, the link extractor module 130 is configured to calculate the normalizing feature.

(vi) A difference feature representing the presence of other extracted links within the theme cluster.

Taking the link-cluster pair 316-1 as an example, the difference feature will be based on the, inter alia, the number of extracted links other than the extracted link 314-1 contained within the first theme cluster 204.

For example, if it is determined that the first theme cluster 204 contains 6 extracted links (respectively, 314-1, 314-2, 314-3, 314-4, 314-5 and 314-6) and that only the extracted link 314-1 is directed to the first published object 114, the link extractor module 130 can determine that 5 out of the 6 extracted links are not directed to the first published object 114. Based on this information, the link extractor module 130 is configured to calculate the difference feature.

(vii) a presence feature representing the presence of a publication source identifier associated with the extracted link in the respective content of the clustered objects contained in the theme cluster;

Taking the link-cluster pair 316-1 as an example, the presence feature is calculated based on the number of clustered objects within the first theme cluster 204 containing, within its respective content, the publication source identifier associated with the extracted link 314-1.

For example, if it is determined that the extracted link 314-1 is directed to the first published object 114, and the first published object 114's publication source is CNN™, the link extractor module 130 is configured to identify how many clustered objects within the first theme cluster 204 contain the publication source identifier "CNN" within their respective content. Based on this information, the link extractor module 130 is configured to calculate the presence feature.

(viii) A content feature representing the presence of one or more publication source identifiers within the content of the clustered object associated with the link-cluster pair.

Taking the link-cluster pair 316-1 as an example, the content feature is calculated based on the presence of one or more publication source identifier within the content of the clustered object associated with the link-cluster pair 316-1.

For example, if the clustered object associated with the link-cluster pair 316-1 has TheGazette™ as its publication source with the following title "Bloomberg: Snowstorm Approaching in East Coast", the link extractor module 130 is configured to identify Bloomberg™ as one publication source identifier. The manner in which the link extractor module 130 is configured to identify the one or more publication source identifier is not limited, and may, as an example, be done by parsing the content of the clustered object associated with the link-cluster pair 316-1 and cross-referencing predetermined potential publication source identifiers stored in a database (not depicted) linked to the server 120. Based on this information, the link extractor module 130 is configured to calculate the content feature.

(ix) a reference feature representing the presence of the publication source identifier associated with the extracted link within the respective content of the clustered objects contained in the theme cluster.

Taking the link-cluster pair 316-1 as an example, the reference feature will be based on the presence of the publication source identifier associated with the extracted link 314-1 within the content of the first theme cluster 204.

For example, if the extracted link 314-1 is directed to the first published object 114, which is an article published by Bloomberg™, the link extractor module 130 is configured to identify if the publication source identifier "Bloomberg" is contained within the content of the clustered objects 210-1 to 210-4. Based on this information, the link extractor module 130 is further configured to calculate the reference feature.

It is to be expressly understood that the set of features provided hereinabove are not limitative, and as a person skilled in the art would understand, other types of features or modifications are contemplated.

Figure 4:
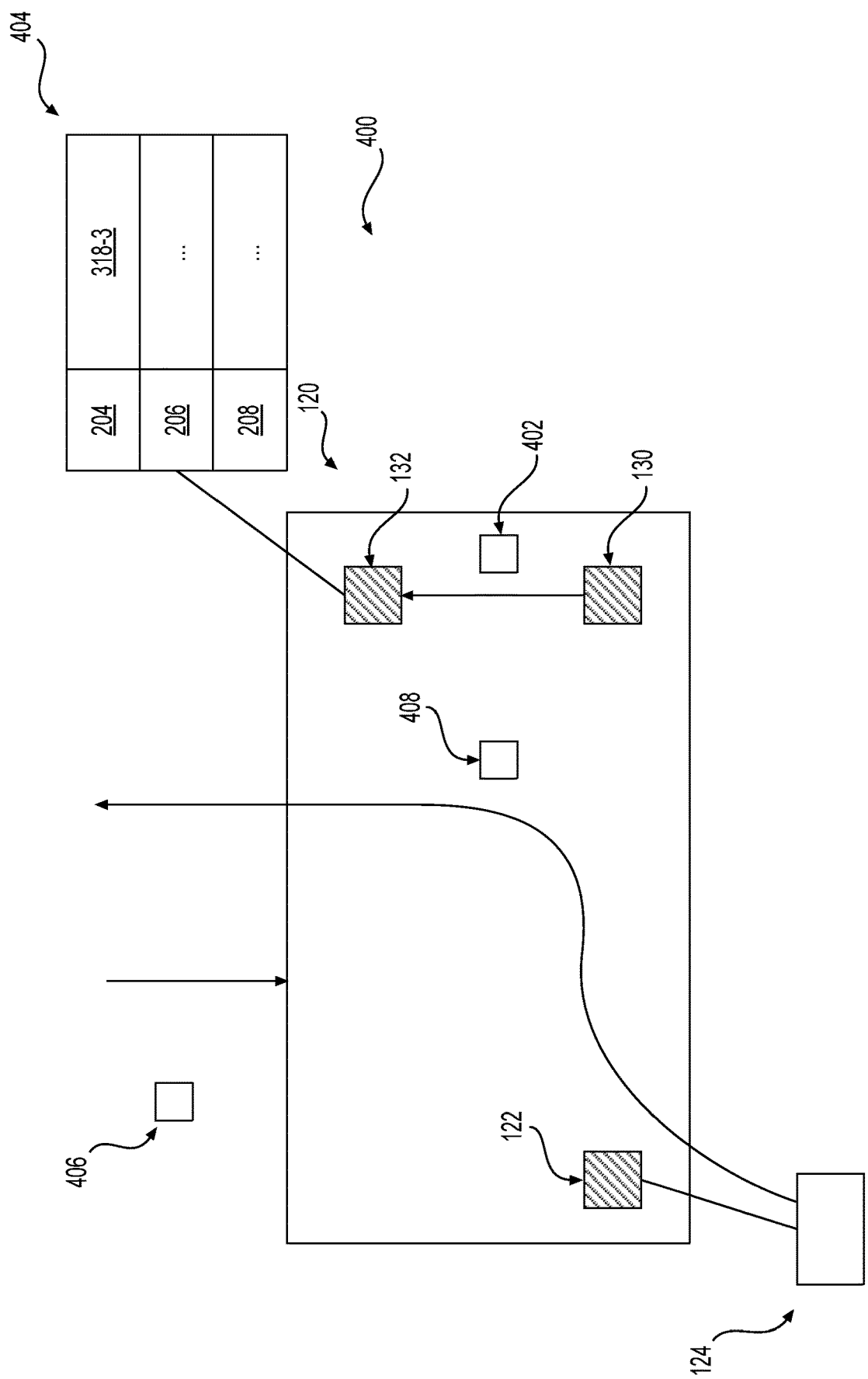
FIG. 4 is a block diagram illustrating an architecture of the server of the system of FIG. 1, illustrating an example of a source link prediction process.

FIG. 4 is a schematic diagram depicting an architecture 400 of the server 120 illustrating an example of a source link prediction process, the architecture 400 including the source link prediction algorithm 132, according to some implementations.

The link extractor module 130 is configured to transmit a data packet 402 to the source link prediction algorithm 132. The data packet 402 comprises of the set of features associated with the one or more link-cluster pairs 316. In some embodiments of the present technology, the source link prediction algorithm 132 is a machine learning algorithm that is configured to determine which of the extracted links comprising the set of extracted links 314 is the source link. As such, it could be stated that, prior to arriving at the source link prediction algorithm 132, each of the extracted links comprising the set of extracted links 314 is a potential source link.

Using the set of features for each link-cluster pair (e.g. link-cluster pair 316-1 to 316-6) contained in the data packet 402 as an input feature, the source link prediction algorithm 132 is trained to determine the source link associated with the given theme cluster. In some embodiments of the present technology, the source link may be directed to one or more of the clustered objects contained within the associated theme cluster. In a further embodiment, the source link may be directed to a published object that has not been clustered within the given theme cluster. For example, the source link associated with the first theme cluster 204 may be directed to the published object which has not been clustered within the first theme cluster 204, or which has not been crawled previously, such as a social media post.

In some embodiments, the source link prediction algorithm 132 is linked to a source database 404. In some embodiments of the present technology, the source database 404 stores the source link associated with each of the theme clusters. Following the example with regards to the first theme cluster 204, it may be determined by the source link prediction algorithm 132, based on the analysis of the one or more link-cluster pairs 316, that the extracted link 314-3 is the source link. As such, within the source database 404, the first theme cluster 204 is associated with the extracted link 314-3. Again, it should be expressly understood that the example provided herein are merely for illustration and not to limit the scope of the present technology.

Also illustrated within FIG. 4 is a data packet 406 transmitted by the electronic device 102 to the server 120. In some embodiments, the data packet 406 is a request from the electronic device 102 to access a particular object associated with the news aggregator service. For example, the user of the electronic device 102 may request a particular article by clicking on a link provided in the main news aggregator page.

Generally speaking, upon receiving the data packet 406, the server 120 is configured to retrieve, from the crawler database 124, a data packet 408, which comprises of an indication of the requested published object for display at the electronic device 102.

In some embodiments of the present technology, the server 120 is configured to determine if the requested published object contained within the data packet 408 has previously been clustered, and or alternatively, if a source link has been determined. Upon determining that the requested published object has previously been clustered, the server 120 is further configured to retrieve from the source database 404 the source link associated with given theme cluster.

In a further embodiment, upon retrieving the source link associated with the given theme cluster, the server 120 is configured to cause the electronic device 102 to present concurrently with the requested published object, the source link, when displayed at the electronic device 102. The manner in which the source link is displayed on the electronic device 102 is not limited, and may be presented in a portion of the browser application 104, or a portion of the mobile application 106. It is also contemplated that the source link can be displayed not on a portion of the browser application 104 or a portion of the mobile application 106, but as pop-up window, or the like.

Figure 5:
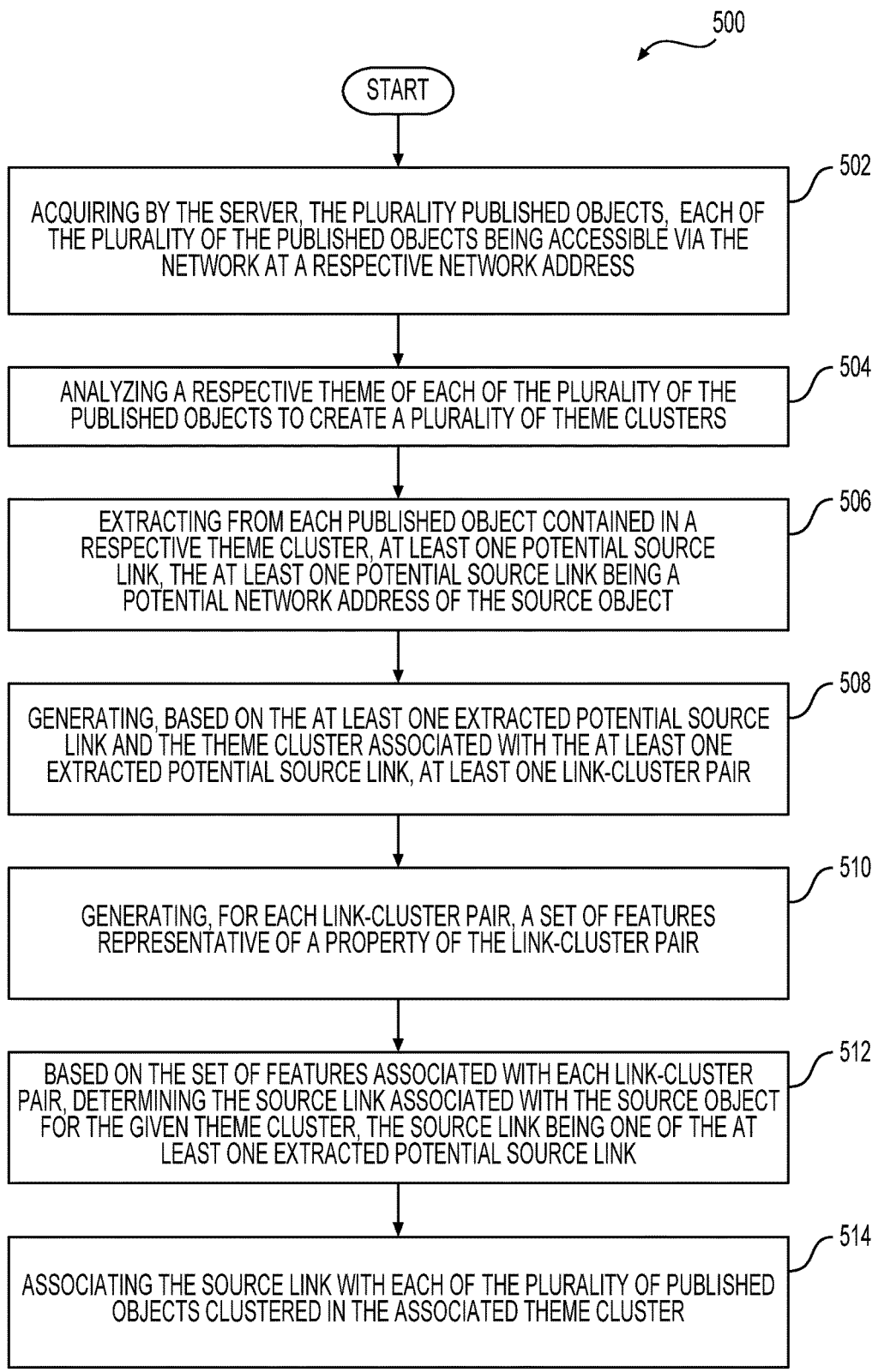
FIG. 5 is a flow diagram of an exemplary method for determining the source link.

Given the architectures described with reference to FIG. 1 to FIG. 4, and the examples provided above, it is possible to implement a method of determining a source link to a source object with the server 120. FIG. 5 depicts a flowchart of a method 500, the method 500 being executed in accordance with a non-limiting embodiment of the present technology. It should be noted that some steps of the method 500 may be executed in parallel or in a different sequence and that the flowchart depicted in FIG. 5 is merely for illustration purposes only.

Step 502—Acquiring by the server, the plurality of published objects, each of the plurality of the published objects being accessible via the network at a respective network address;

The method 500 starts at step 502, where the server 120 receives from the crawler database 124 the set of crawled objects 202 via the data packet 203. The set of crawled objects 202 include the one or more published objects (e.g. first published object 114 and second published object 116) crawled by the crawler application 122. The step 502 is executed in response to the crawler application 122 crawling the first object hosting server 115 and/or the second object hosting server 118 to retrieve the published objects (e.g., first published object 114 and second published object 116) and indexing them in the crawler database 124. The step 502 can also be executed in response to the determination that the theme clustering for the set of crawled objects 202 has not been executed yet.

The method 500 will be explained below with reference to one scenario. It should be understood that the scenario presented herein below are for illustration purposes only, and the present technology is in no way to be limited based on the scenario presented below.

Scenario 1: The server 120 receives from the crawler database 124 a set of crawled objects 202. The set of crawled objects 202 comprises of a plurality of published objects having its respective theme (i.e. topic) and its respective network address (e.g., URL).

Step 504—Analyzing a respective theme of each of the plurality of published objects to create a plurality of theme clusters.

At 504, in response to receiving the data packet 203, the server 120 creates theme clusters from the set of crawled objects 202 using the clustering module 126. The clustering module 126 is configured to analyze the content of each published objects within the set of crawled objects 202 and stores them into a theme cluster (e.g. first theme cluster 204, second theme cluster 206, third theme cluster 208), which is then stored in the cluster database 128.

Scenario 1: Upon receiving the data packet 203, the clustering module 126 accesses the content of each crawled objects. The clustering module 126 generates 3 theme clusters:

4 published objects relating to a story of a dog who learned how to do a flip with a skate board (first theme cluster 204);

3 published objects relating to a human killing shark befriending a fisherman (second theme cluster 206).

2 published objects relating to a ravaging fire in Taumatawhakatangihangakoauauotamateapokaiwhenuakitanatahu, of New Zealand (third theme cluster 208).

The cluster database 128 stores the first theme cluster 204 with the set of associated clustered objects 210 (i.e. the 4 published objects). The cluster database 128 stores the second theme cluster 206 with the set of associated clustered objects 212 (i.e. the 3 published objects). The cluster database 128 stores the third theme cluster 208 with the set of associated clustered objects 214 (i.e. the two published objects).

Step 506—Extracting from each of the published object contained in a respective theme cluster, at least one potential source link, the at least one potential source link being a potential network address of the source object;

At step 506, having populated the cluster database 128, the server 120 extracts from each of the clustered objects the outgoing links 308, via the link extractor module 130, and populates the extracted link database 312. As stated previously, prior to being processed by the source link prediction algorithm 132, each of the extracted links comprising the set of extracted links 314 is a potential source link.

The step 506 is executed in response to the link extractor module 130 receiving the data packet 302 from the cluster database 128, or alternatively, from the clustering module 126.

Scenario 1: With regards to the first theme cluster 204, the link extractor module 130 extracts 6 outgoing links 308. As seen below, 2 of 6 links are directed to a specialized news agency are identical network addresses, 2 of the 6 links are directed to a post in a social media having the same network addresses, 1 of the 6 links is directed to a blog post, and the remaining 1 is directed to a news agency, as follow:

www.dognews.com/dog-does-a-flip-so-cool/ (specialized news agency)
www.friendconnect.com/notes123/john.doe123/ (social media)
www.dognews.com/dog-does-a-flip-so-cool/ (specialized news agency)
www.friendconnect.com/notes123/john.doe123/ (social media)
www.lovemelikeyoulikeyourdog.com/post123 (blog)
www.cnn.com/dog-does-a-flip/ (news agency)

With regards to the second theme cluster 206, the extractor module extracts 5 outgoing links 308. As seen below, 4 out of the five links are directed to news agencies, and the remaining 1 link is directed to a blog post, as follow:

www.thelocalnewspaper.com/human-flesh-eating-shark-be-friends-salmon-fisherman/ (news agency)
www.thefisherman.com/fisherman-tickles-shark-without-becoming-armless/ (news agency)
www.fishermanjoeblog.com/post123/how-i-became-bff-with-a-shark/ (blog)
www.mayonews.ca/to-be-eaten-or-to-befriend-that-is-the-question-for-lucky-fisherman/ (news agency)
www.randomnews.com/instead-of-blood-the-sea-was-filled-with-bromance-between-two-species/ (news agency)

With regards to the third theme cluster 208, the extractor module extracts 2 outgoing links 308. As seen below, both of the links are directed to news agencies, as follow:

www.newzealandnews.com/fire-fire-fire-everywhere-in-un-pronounciable-hill/ (news agency)
www.bhutannews.com/fire-in-new-zealand (news agency)

Step 508—Generating, based on the at least one extracted potential source link and the theme cluster associated with the at least one extracted potential source link, at least one link-cluster pair;

At step 508, the server 120 generates, via the link extractor module 130, for each extracted links 314, a link-cluster pair 316.

Scenario 1: The server 120, via the link extractor module 130, generates 6 link-cluster pairs with regards to the 6 extracted links from the first theme cluster 204.

The server 120, via the link extractor module 130, generates 5 link-cluster pairs with regards to the 5 extracted links from the second theme cluster 206.

The server 120, via the link extractor module 130, generates 2 link-cluster pairs with regards to the 2 extracted links from the third theme cluster 208.

Step 510—Generating, for each link-cluster pair, a set of features representative of the properties of the link-cluster pair;

At step 510, the server 120 generates, for each link-cluster pair 316, a set of features representative of the properties of the link-cluster pair 316.

Scenario 1: The server 120, via the link extractor module 130, calculates the set of features for each of the 6 link-cluster pairs associated with the first theme cluster 204.

The server 120, via the link extractor module 130, calculates the set of features of each of the 5 link-cluster pairs associated with the second theme cluster 206.

The server 120, via the link extractor module 130, calculates the set of features of each of the 2 link-cluster pairs associated with the third theme cluster 208.

Step 512—Based on the set of features associated with each link-cluster pair, determining the source link associated with the source object for the given theme cluster, the source link being one of the at least one extracted potential source link;

At step 512, the server 120 determines, via the source link prediction algorithm 132, the source link associated with the source object for the given theme cluster.

Using the set of features for each link-cluster pair (e.g. link-cluster pair 316-1 to 316-6) contained in the data packet 402 as an input feature, the source link prediction algorithm 132 is trained to determine the source link associated with the given theme cluster.

The step 512 is executed in response to, the receiving of the data packet 402 by the source link prediction algorithm 132, by the link extractor module 130.

Scenario 1: Based on the set of features of the 6 link-cluster pairs, it is predicted by the source link prediction algorithm 132 that the following link is the source link associated with the source object for the first theme cluster 204: www.friendconnect.com/notes123/john.doe123/.

Based on the set of features of the 5 link-cluster pairs, it is predicted by the source link prediction algorithm 132 that the following link is the source link associated with the source object for the second theme cluster 206: www.fishermanjoeblog.com/post123/how-i-became-bff-with-a-shark/.

Based on the set of features of the 2 link-cluster pairs, it is predicted by the source link prediction algorithm 132 that the following link is the source link associated with the source object for the third theme cluster 208: www.newzealandnews.com/fire-fire-fire-everywhere-in-unprunciable-hill/.

Step 514—Associating the source link with each of the plurality of published objects clustered in the associated theme cluster.

At step 514, the server 120 associates the source link with each of the plurality of published objects clustered in the associated theme cluster, in the source database 404.

Scenario 1: With regards to the first theme cluster 204, the server 120 associates the link www.friendconnect.com/notes123/john.doe123/ to be the source link for each of the objects contained therein.

With regards to the second theme cluster 206, the server 120 associates the link www.fishermanjoeblog.com/post123/how-i-became-bff-with-a-shark/ to be the source link for each of the objects contained therein.

With regards to the third theme cluster 208, the server 120 associates the link www.newzealandnews.com/fire-fire-fire-everywhere-in-unprunciable-hill/ to be the source link for each of the objects contained therein.

The method 500 then terminates.

One of the main applications of the source link prediction is the proper prediction of the source object for any published objects. For instance, under the present technology, there is no need for the source object to be crawled and/or be clustered. For example, in situations where the source object is a published object on a social media, or another platform on which the crawler application 122 from the server 120 may not crawl, the present technology is able to determine the source link. Thus, it could be said that the source object is determined without the need to access the source object by the server 120. In an alternative embodiment, upon determining the source link, the server 120 is configured to access the source object based on the determined source link to determine if the source link is a valid web address.

It should be expressly understood that other methods for source link prediction can be used. Those skilled in the art, having benefited from the teachings of the present technology, will be able to select a proper source link prediction algorithm that takes into account the set of features from the link-cluster pairs as has been disclosed in accordance with embodiments of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

CLAUSE 1. A method (500) of determining a source link, the source link being a network address associated with a source object having an original theme from which the theme of a plurality of published objects (114; 116) are derived, the method executable on a server (120), the (120) server being coupled to a network (112), the method (500) comprising:

a. acquiring (502) by the server (120), the plurality of published objects (114; 116), each of the plurality of the published objects (114; 116) being accessible via the network (112) at a respective network address;
b. analyzing (504) a respective theme of each of the plurality of the published objects (114; 116) to create a plurality of theme clusters (204; 206; 208);
c. extracting (506) from each published object contained in a respective theme cluster, at least one potential source link (314), the at least one potential source link (314) being a potential network address of the source object;
d. generating (508), based on the at least one extracted potential source link (314) and the theme cluster associated with the at least one extracted potential source link (314), at least one link-cluster pair (316),
e. generating (510), for each link-cluster pair (316), a set of features representative of a property of the link-cluster pair (316);
f. based on the set of features associated with each link-cluster pair (316), determining (512) the source link associated with the source object for the given theme cluster, the source link being one of the at least one extracted potential source link (314); and
g. associating (514) the source link with each of the plurality of published objects clustered in the associated theme cluster.

CLAUSE 2. The method of CLAUSE 1, further comprising responsive to a request for access by an electronic device (102), via the network (112), to a given published object from the plurality of published objects (114; 116), retrieving the given published object and concurrently transmitting an indication of the source link.

CLAUSE 3. The method of any one of CLAUSES 1 to 2, wherein the plurality of published objects (114; 116) is acquired from a crawler database (124).

CLAUSE 4. The method of any one of CLAUSES 1 to 3, wherein analyzing the respective theme comprises analyzing a respective content of the plurality of published objects (114; 116), the content including at least one of (i) a title and (ii) a body of text.

CLAUSE 5. The method of any one of CLAUSES 1 to 4, wherein the at least one potential source link (314) of a given published object comprises of at least one outgoing link (308) contained in the given published object.

CLAUSE 6. The method of any one of CLAUSES 1 to 5, wherein the source object is included in the plurality of published objects (114; 116) in the given theme cluster.

CLAUSE 7. The method of any one of CLAUSES 1 to 5, wherein the source object is not included in the plurality of published objects (114; 116) in the given theme cluster.

CLAUSE 8. The method of any one of CLAUSES 1 to 7, wherein prior to extracting the at least one potential source link (314) from a given published object, determining a number of incoming links (310) for the given published object, the number of incoming links (310) representing a number of outgoing links (308) within the published objects (114; 116) of the given theme cluster directed at the given published object.

CLAUSE 9. The method of CLAUSE 8, wherein extracting the at least one potential source link (314) is executed for published objects having a pre-determined number of incoming links (310).

CLAUSE 10. The method of any one of CLAUSES 1 to 9, wherein the set of features comprises of at least one of:
(i) a difference-in-time feature, the difference-in-time feature being associated with a difference in the time of publication of the given published object containing the extracted potential source link and a median publication time for the other published objects contained within the same theme cluster;
(ii) a source reputation feature of a publication source associated with the published object containing the extracted potential source link;
(iii) a destination reputation feature of the source associated with the destination of the extracted potential source link;
(iv) an aggregated reputation feature of publication sources, within the theme cluster, which share the extracted potential source link;
(v) a normalized feature representing the number of published objects sharing the extracted potential source link normalized by the number of published objects contained in the theme cluster;
(vi) a difference feature representing the presence of other extracted potential source links within the theme cluster;
(vii) a presence feature representing the presence of a publication source identifier associated with the extracted potential source link in the content of the published objects contained within the theme cluster;
(viii) a content feature representing the presence of one or more publication source identifiers within the content of the published object associated with the link-cluster pair; and
(ix) a reference feature representing the presence of the publication source identifier associated with the extracted potential source link within the respective content of the of published objects contained within the theme cluster.

CLAUSE 11. The method of CLAUSE 10, wherein the reputation of the publication source associated with the published object containing the potential source link and the reputation of the publication source associated with the potential source link (314) is a pre-determined parameter.

CLAUSE 12. The method of any one of CLAUSES 1 to 11, wherein determining the source link (318-3) is executed using a machine learning algorithm (132).

CLAUSE 13. The method of CLAUSE 12, wherein the machine learning algorithm (132) is configured to receive the set of features as an input feature.

CLAUSE 14. The method of CLAUSE 12, further comprising training the machine learning algorithm (312).

CLAUSE 15. The method of any one of CLAUSES 1 to 14, wherein determining the source link (318-3) is executed without accessing the source object.

CLAUSE 16. A server (120) configured to determine a source link, the source link being a network address associated with a source object having an original theme from which the theme of a plurality of subsequently published objects are derived, the server (120) being coupled to a network (112), the server (120) comprising:
at least one computer processor configured to execute the method of any one of CLAUSES 1 to 15.

We claim:

1. A method of determining a source link, the source link being a network address associated with a source object having an original theme from which the theme of a plurality of published objects are derived, the method executable on a server, the server being coupled to a network and configured to execute a crawling function, the server being further configured to access a crawler database storing the plurality of published objects previously crawled by the crawling function, the method comprising:
acquiring by the server, the plurality of published objects from the crawler database, each of the plurality of the published objects being accessible via the network at a respective network address;
analyzing a respective theme of each of the plurality of the published objects to create a plurality of theme clusters;
extracting from each published object contained in a respective theme cluster, at least one potential source link, the at least one potential source link being a potential network address of the source object;
generating, based on the at least one extracted potential source link and the theme cluster associated with the at least one extracted potential source link, at least one link-cluster pair,
generating, for each link-cluster pair, a set of features representative of a property of the link-cluster pair, the set of features comprising:
a normalized feature representing the number of published objects sharing the extracted potential source link normalized by the number of published objects contained in the theme cluster;
based on the set of features associated with each link-cluster pair, determining the source link associated with the source object for the given theme cluster, the determining comprising inputting the set of features into a machine learning algorithm, the source link being one of the at least one extracted potential source link, and the determining the source link being executed without having previously stored the source object within the crawler database by the crawling function; and
associating the source link with each of the plurality of published objects clustered in the associated theme cluster.

2. The method of claim 1, further comprising responsive to a request for access by an electronic device, via the network, to a given published object from the plurality of published objects, retrieving the given published object and concurrently transmitting an indication of the source link.

3. The method of claim 1, wherein the plurality of published objects is acquired from a crawler database.

4. The method of claim 1, wherein analyzing the respective theme comprises analyzing a respective content of the plurality of published objects, the content including at least one of (i) a title and (ii) a body of text.

5. The method of claim 1, wherein the at least one potential source link of a given published object comprises of at least one outgoing link contained in the given published object.

6. The method of claim 1, wherein the source object is not included in the plurality of published objects in the given theme cluster.

7. The method of claim 1, wherein prior to extracting the at least one potential source link from a given published object, determining a number of incoming links for the given published object, the number of incoming links representing a number of outgoing links within the published objects of the given theme cluster directed at the given published object.

8. The method of claim 7, wherein extracting the at least one potential source link is executed for published objects having a pre-determined number of incoming links.

9. The method of claim 1, wherein the set of features further comprises of at least one of:
a difference-in-time feature, the difference-in-time feature being associated with a difference in the time of publication of the given published object containing the extracted potential source link and a median publication time for the other published objects contained within the same theme cluster;

a source reputation feature of a publication source associated with the published object containing the extracted potential source link;

a destination reputation feature of the source associated with the destination of the extracted potential source link;

an aggregated reputation feature of publication sources, within the theme cluster, which share the extracted potential source link;

a difference feature representing the presence of other extracted potential source links within the theme cluster;

a presence feature representing the presence of a publication source identifier associated with the extracted potential source link in the content of the published objects contained within the theme cluster;

a content feature representing the presence of one or more publication source identifiers within the content of the published object associated with the link-cluster pair; and a reference feature representing the presence of the publication source identifier associated with the extracted potential source link within the respective content of the published objects contained within the theme cluster.

10. The method of claim 9, wherein the reputation of the publication source associated with the published object containing the potential source link and the reputation of the publication source associated with the potential source link is a pre-determined parameter.

11. The method of claim 1, further comprising training the machine learning algorithm.

12. A server configured to determine a source link, the source link being a network address associated with a source object having an original theme from which the theme of a plurality of published objects are derived, the server being coupled to a network and configured to access a crawler database, the server comprising:

at least one computer processor configured to:
execute a crawling function configured to store the plurality of published objects previously crawled;
acquire by the server, the plurality of published objects, each of the plurality of the published objects being accessible via the network at a respective network address;
analyze a respective theme of each of the plurality of the published objects to create a plurality of theme clusters;
extract from each published object contained in a respective theme cluster, at least one potential source link, the at least one potential source link being a potential network address of the source object;
generate, based on the at least one extracted potential source link and the theme cluster associated with the at least one extracted potential source link, at least one link-cluster pair,
generate, for each link-cluster pair, a set of features representative of a property of the link-cluster pair, the set of features comprising at least:
a normalized feature representing the number of published objects sharing the extracted potential source link normalized by the number of published objects contained in the theme cluster;
based on the set of features associated with each link-cluster pair, determine the source link associated with the source object for the given theme cluster by inputting the set of features into a machine learning algorithm, the source link being one of the at least one extracted potential source link, and the determining the source link being executed without having previously stored the source object within the crawler database by the crawling function; and
associate the source link with each of the plurality of published objects clustered in the associated theme cluster.

13. The server of claim 12, the processor further configured to, responsive to a request for access by an electronic device, via the network, to a given published object from the plurality of published objects, retrieve the given published object and concurrently transmit an indication of the source link.

14. The server of claim 12, wherein the plurality of published objects is acquired from a crawler database.

15. The server of claim 12, wherein the analysis of the respective theme comprises analyzing a respective content of the plurality of published objects, the content including at least one of (i) a title and (ii) a body of text.

16. The server of claim 12, wherein the set of features further comprises of at least one of:

a difference-in-time feature, the difference-in-time feature being associated with a difference in the time of publication of the given published object containing the extracted potential source link and a median publication time for the other published objects contained within the same theme cluster;

a source reputation feature of a publication source associated with the published object containing the extracted potential source link;

a destination reputation feature of the source associated with the destination of the extracted potential source link;

an aggregated reputation feature of publication sources, within the theme cluster, which share the extracted potential source link;

a difference feature representing the presence of other extracted potential source links within the theme cluster;

a presence feature representing the presence of a publication source identifier associated with the extracted potential source link in the content of the published objects contained within the theme cluster;

a content feature representing the presence of one or more publication source identifiers within the content of the published object associated with the link-cluster pair; and a reference feature representing the presence of the publication source identifier associated with the extracted potential source link within the respective content of the published objects contained within the theme cluster.

17. The method of claim 1, wherein the method further comprises:
prior to associating the source link with each of the plurality of published objects clustered in the associated theme cluster, accessing the source object using the source link.

18. The method of claim 1, wherein
the server is further coupled to a crawler database, the crawler database storing the plurality of published objects, the plurality of published objects having been crawled by a crawler application; and wherein
the acquiring the plurality of published objects comprises acquiring the plurality of published objects from the crawler database; and wherein the source object has not been previously crawled by the crawler application.

\* \* \* \* \*